Figure 1:
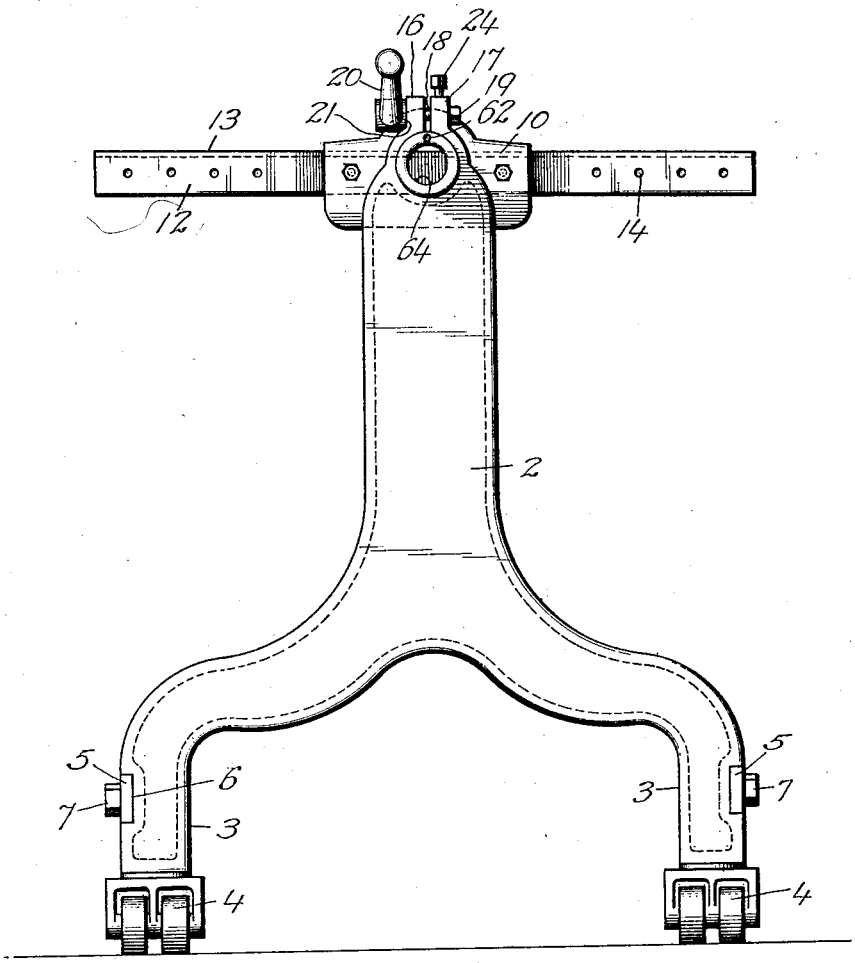

G. F. WERTH.
MOTOR STAND.
APPLICATION FILED AUG. 9, 1919.

1,409,266.

Patented Mar. 14, 1922.
4 SHEETS—SHEET 1.

Inventor
George F. Werth
By: Offield, Towle, Graves & Soans Attys.

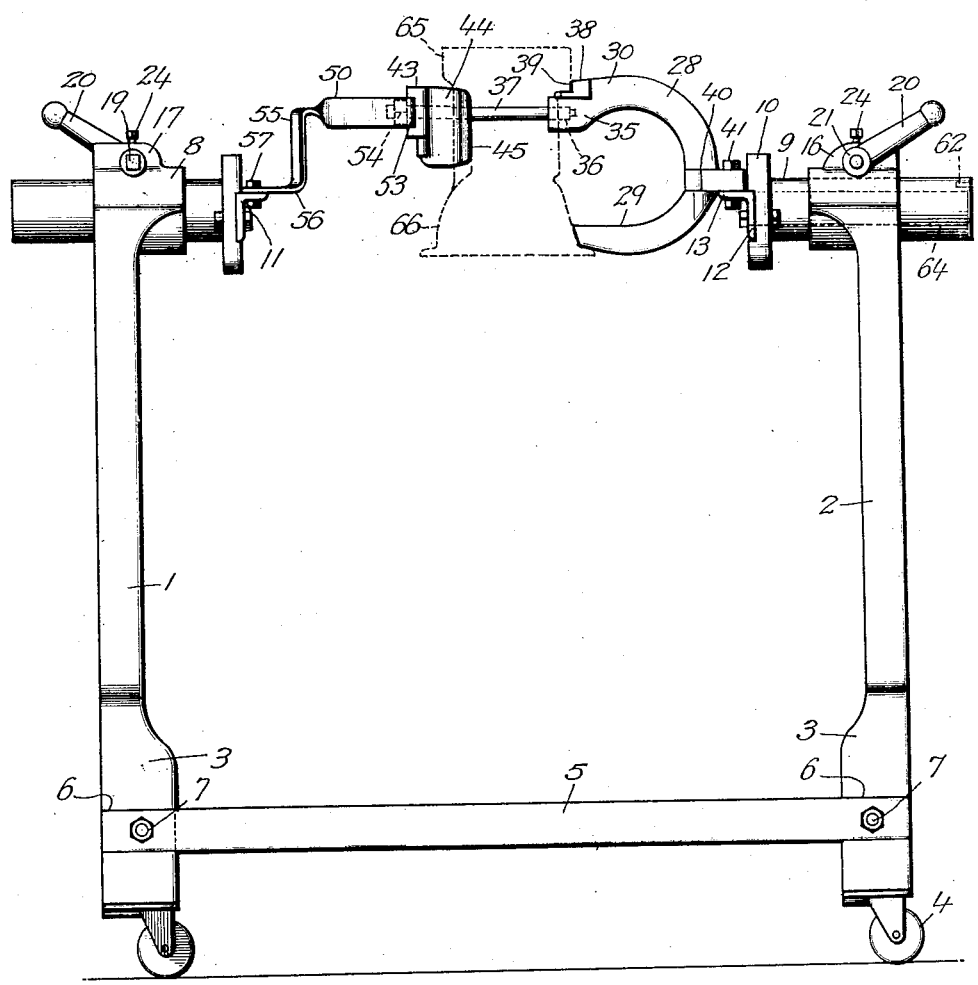

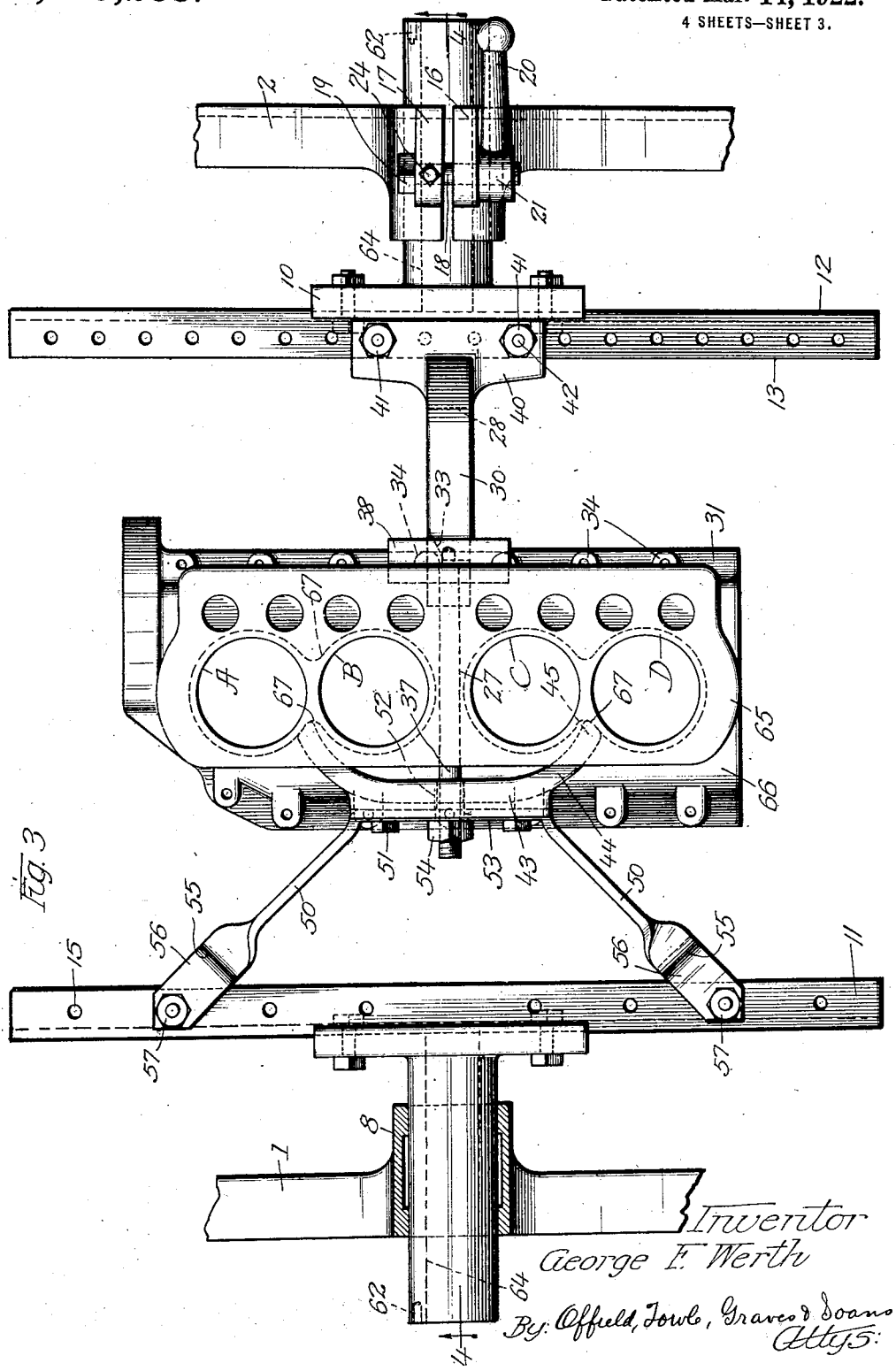

G. F. WERTH.
MOTOR STAND.
APPLICATION FILED AUG. 9, 1919.
1,409,266.
Patented Mar. 14, 1922.
4 SHEETS—SHEET 4.
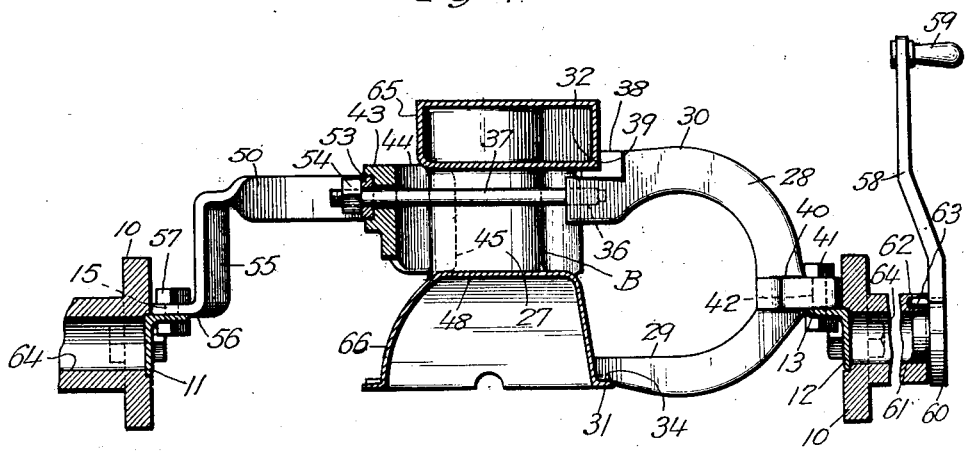
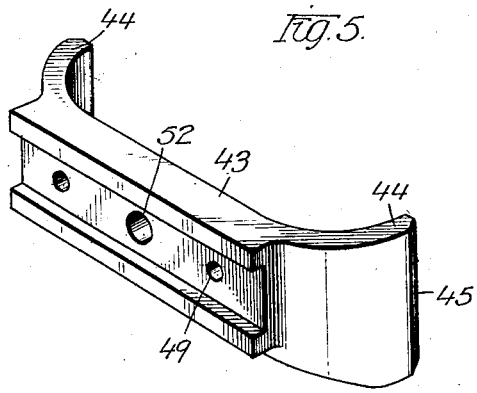
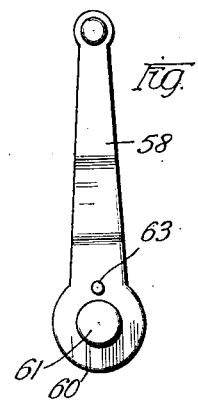
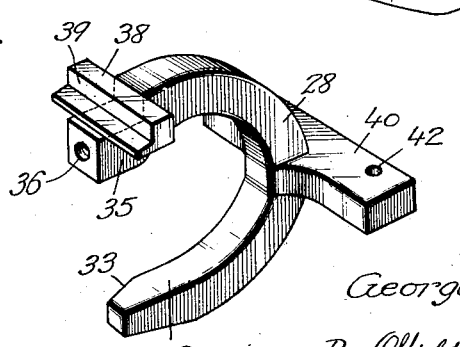
Inventor
George F. Werth
By: Offield, Towle, Graves & Soans
Attys.

UNITED STATES PATENT OFFICE.

GEORGE F. WERTH, OF CHICAGO HEIGHTS, ILLINOIS, ASSIGNOR TO CANEDY-OTTO MFG. CO., OF CHICAGO HEIGHTS, ILLINOIS, A CORPORATION OF ILLINOIS.

MOTOR STAND.

1,409,266. Specification of Letters Patent. Patented Mar. 14, 1922.

Application filed August 9, 1919. Serial No. 316,505.

*To all whom it may concern:*

Be it known that I, GEORGE F. WERTH, a citizen of the United States, residing at Chicago Heights, in the county of Cook and State of Illinois, have invented certain new and useful Improvements in Motor Stands, of which the following is the specification.

My invention has reference more particularly to a frame, preferably portable, which is adapted to support a motor in an adjustable manner thereon, so that it may be removed as required to enable a workman to have convenient access to all parts of the motor.

The principal objects of my invention are, to provide an improved motor stand which is constructed to be universally applicable to various types and sizes of motors, so that when the stand is used in a repair shop it will accommodate practically any type of motor which may be brought in for repairs; to provide a motor stand of this character having improved means for regulating the distance between lateral supports whereon the motor is mounted; to provide improved means for swinging the motor on the motor stand and whereby the motor may be readily locked in any position to which it is adjusted; to provide a motor stand with special provision for supporting a Ford motor whereby the cylinder block is securely clamped in position in such a manner that all detachable parts and the bolts holding same onto the cylinder block are accessible for installation and removal; to provide a device of this character of simple and economical construction embodying novel features of improvement, rendering the device more desirable for its purpose than motor stands which have been heretofore provided.

On the drawings, Fig. 1 is a side view of a motor stand constructed in accordance with my invention.

Fig. 2, a front view of the motor stand, equipped with brackets for mounting a Ford motor thereon.

Fig. 3, an enlarged fragmentary view of the structure shown in Fig. 2 holding a Ford cylinder block.

Fig. 4, a view partly in section on the line 4—4 of Fig. 3.

Fig. 5, a perspective view of the bracket used at one side of the Ford motor.

Fig. 6, a similar view of the bracket used at the other side of the Ford motor, and Fig. 7, a front view of the crank or handle which is employed for adjusting the motor support with the motor thereon.

Referring to the drawings, the reference numerals 1 and 2 indicate spaced standards of similar construction, except that they are right and left hand. These standards are widened out at the bottom to afford spaced legs 3, each of which is preferably provided with caster wheels or rollers 4, to enable the motor stand to be readily moved about, and the corresponding legs 3 of the standards 1 and 2 are connected together by the transverse bars 5, the ends of which are seated in sockets 6, provided therefor in the legs 3, and secured in the sockets by bolts 7. This construction provides a rigid connection to hold the standards 1 and 2 in spaced upright position, and affords a clear space of considerable depth extending down from the upper ends of the standards to permit a motor to be adjusted therebetween.

Each standard 1 and 2 is provided at its upper end with an elongated cylindrical split bearing 8, the bearings of the two standards being in axial alinement, and each has a long shaft or spindle 9 mounted therein and provided at its inner end with a head 10 recessed on the inner face or otherwise constructed to have the angle iron 11 bolted thereto. These angle irons on the two heads 10 preferably lie in parallel planes, as shown in Fig. 3, and both extend a considerable distance on the opposite sides of the axis of the spindles 9, and both the upright flange 12 and the inwardly extending flange 13 of each angle iron are provided with a plurality of perforations or bolt-holes 14 and 15 respectively, to effect attachments of various types of motors or motor supporting brackets thereon.

The split edges of the clamp bearings 8 have spaced ears 16 and 17 which normally spring apart sufficiently to permit turning and also endwise adjustment of the spindle 9 therein, the latter adjustment being provided to properly space the heads 10 so that the angle irons 11 may be positioned to support motors of various widths, while the former adjustment is provided to enable the motor, when supported on the angle irons 11, or otherwise mounted on the motor stand, to be swung around in any position which the operator may find convenient to gain access to the various parts of the motor in repairing, assembling, etc.

For contracting the split bearings 8, to lock the spindles 9 and parts mounted thereon in any positions to which they may be adjusted, the ears 16 and 17 of each bearing are perforated and have a bolt 18 extending therethrough with the head 19 at one end engaging against the flange 17, and the other end threaded and projecting through the flange 16. A lever or handle 20 has a hub or nut portion 21 at one end threaded on the outer end of the bolt, to engage against the flange 16, whereby sufficient pressure may be applied to contract the split bearing 8 into tight engagement with the spindle 9.

I also employ a cap screw 24, which is threaded in the flange 17 to engage the bolt 18, so that the latter is held stationary while the lever 20 is operated. This screw, of course, may be released from time to time if required, and the bolt 18 turned sufficiently to regulate the clamping position of the lever 20 and afford the required swing of the lever 20 to properly tighten and loosen the clamp bearing 8.

The motors which are commonly employed in automobiles usually have one or more bearings at each side which may be readily attached to the flanges of the angle irons 11 when the latter are properly spaced apart, and in cases where the motors are provided with end bearings which require support a transverse support may be readily connected between the angle iron 11 to connect with such bearings. It will no doubt be understood that these angle irons with their plurality of bolt-holes or perforations and the adjustment thereof, which is provided, enable practically any type of automobile motor to be mounted thereon, either directly or by employing attachments which may be found in most assembling plants or repair shops.

In view of the fact that a large percentage of repair work encountered is in connection with Ford motors, owing to the large number of Ford cars in use, I have provided special attaching brackets for Ford motors, whereby the latter may be conveniently mounted on my motor stand in such a manner as to permit access to all bolts and parts which it is necessary to operate upon or remove from the motor block in tearing down, assembling or repairing the motor.

The Ford motor is constructed with a cylinder block, such as shown in Figs. 2, 3, and 4, comprising four cylinders, indicated at A, B, C, and D in Fig. 3, and having a water jacket 65 surrounding the upper ends of the cylinders, and the upper half 66 of the crank case formed integral with the lower ends of the cylinders. The cylinders are arranged in the block in two pairs, cylinders A and B being close together and having their external walls merged together, with a recess 67 therebetween at each side of the cylinder block, and the cylinders C and D are likewise arranged close together. The inner cylinders of each pair, viz., B and C are spaced apart as shown, leaving an opening 27 therebetween, and the cylinder block is supported on my stand by a pair of brackets or clamp members engaging on the opposite sides of the motor block, and secured together by a bolt passing through this opening 27.

The bracket or clamp for the valve side or right hand side of the cylinder block, looking at Fig. 4, is indicated at 28, and is C-shaped, having a lower arm 29, and an upper arm 30, suitably spaced, so that the former engages against the flange 31 of the upper half 66 of the crank case, which is provided for the attachment of the lower half of the crank case thereto, and the latter arm of the C-shaped bracket 28 engages the shoulder 32, formed by the wall of the water jacket 65, which surrounds the upper ends of the cylinders.

The lower arm 29 is tapered or suitably formed at the end, as shown at 33, so that the end of the arm may properly engage the flange 31, approximately, in the vertical plane of the opening 27, between the two center cylinders, and avoid the boss 34 of the flange 31, through which a bolt is passed for connecting the upper and lower halves of the crank case. By cutting away this arm 29 at 33, clearance is also provided to engage this bolt with a wrench and remove same, while the motor is clamped in place on the motor stand.

The other arm 30 of this clamp 28 has an enlarged end 35, with a threaded aperture 36 extended into the end in position to receive the threaded end of the bolt 37, which is thus secured thereto so as to be inserted through the opening 27 between the two center cylinders, and above this enlarged end 35, the arm 30 is also provided with a laterally extending block 38, which may be integral with the arm 30, or attached thereto, and has an angular seat 39, into which the shoulder 32 of this water jacket 65 fits. The lateral elongation of this block 38 serves to hold the bracket 28 in upright position with respect to the motor, and prevents the lower arm 29 from swinging laterally along the flange 31.

The bight of this C-shaped bracket 28 is formed with the elongated flange 40 extending laterally at each side thereof, and also outwardly from the bracket 28, so as to rest upon the flange 13 of one of the angle irons 11, being secured to this flange by the bolts 41 passed through apertures 42 of the flange 40, and corresponding bolt holes in the flange 13 of the angle iron 11.

For engagement with the opposite side of the motor block, I provide a wide arched or yoke-shaped bracket or clamp plate 43, having inturned ends 44, beveled as at 45, to engage respectively in the recesses 67, provided between and at the juncture respectively of the first and second cylinders, A and B, and the third and fourth cylinders, C and D, as shown in Fig. 3. The vertical width of this bracket is substantially the same as the vertical distance between the bottom wall of the water jacket and the upper wall 48 of the crank case, so that the ends 44 fit readily therebetween. The outer face of this bracket 43 is longitudinally channeled at 49, and has the intermediate portion of the wrought iron bracket 50 secured therein by a number of bolts 51, and the bracket 43 is provided intermediate of its ends with a perforation 52, and the wrought iron bracket 50 with a corresponding perforation 53, through which the bolt 37 is inserted for clamping the motor block between the brackets 28 and 43. One end of this bolt 37, as hereinbefore indicated, is secured by means of a threaded connection in the enlarged end 35 of the bracket 28, so as to aline with and project through the perforations 52 and 53, when the brackets 28 and 43 are properly fitted against the opposite sides of the motor, and by tightening the nut 54, on the opposite end of this bolt 37, against the outer face of the wrought iron bracket 50, the brackets 28 and 43 may be drawn toward one another so that the motor is securely clamped between the brackets 28 and 43, and rigidly supported thereby.

The wrought iron bracket 50 has an arm extending from each end of the bracket 43, and bent downwardly, as at 55, and provided with a perforated foot portion 56, whereby the wrought iron bracket 50 and the motor engaging bracket 43 are secured to the flange 13 of one of the angle irons 11 of the motor stand by means of the bolts 57.

The bracket 50 is bent upwardly, and the flange 40 of the bracket 28 positioned somewhat below the vertical center thereof, so that the brackets 28 and 43 occupy the proper relative position, and also the proper position above the axis of the spindles 9, so that when the complete motor is carried by the motor stand, the center of gravity is sufficiently near the axis of the spindles 9 so that the motor is not over-balanced on the spindles 9, and may therefore be adjusted with little effort. The extension of the wrought iron bracket 50 end-wise and laterally from the motor affords access to be conveniently had to the various bolts and connections on the cylinder block, and the C-shaped construction of the bracket 28 likewise permits convenient access to the motor parts and particularly to the crank shaft bearing bolts in the opening 27 between the second and third cylinders, said brackets being thus designed so that the motor, as taken from the car, may be clamped on the motor stand and entirely disassembled and reconstructed when so mounted without the necessity of unfastening the clamps in any stage of the operation, to permit access to connections or parts. This is an important feature of the construction of these brackets, as it is very inconvenient to release the clamps and temporarily support the cylinder block while tearing down or assembling the motor, and no other clamps, so far as I am aware, permit the entire assembling or tearing down of the motor with the clamps continually maintained in place.

The operation and use of this motor stand is thought to be obvious from the foregoing description, it being understood that it is intended to provide a convenient support upon which motors of various types, including particularly such motors as are employed in automobiles, may be conveniently mounted and swung around on the spindles 9, and held in any position to which it is swung, so that the workmen may have the motor in a convenient position to perform any desired operations thereon. It will also be observed that the special attachments which I have provided for Ford motors enable the stand to be quickly adapted for such motors without loss of time, and provides a very desirable attachment, in view of the fact that there are many of such motors in use, and consequently a large percentage of motor repair work on such motors.

For convenience in turning the motor on the stand, I provide one or both of the spindles 9 with a crank connection at the outer end, and a detachable crank therefor. The spindles 9 are preferably hollow tubes, as this affords a large outer bearing surface to be engaged by the clamps 8 without unnecessary weight, and I construct a crank 58 with a handle 59 at one end, and the disk 60 at the other end, having a plug 61, adapted to be inserted in the opening 64 through the spindles 9. The spindle 9 at the outer end has a socket or pin hole 62, and the crank disk 60 a pin 63 extending inwardly from the inner face, so that when the plug 61 is inserted in the opening through the spindle 9, the pin 63 may be inserted in the socket 62, and thereby affords a detachable connection of the crank with the spindle 9, whereby the spindles 9 and the motor mounted therebetween may be readily turned to any position which the workmen desire.

While I have shown and described my invention in a preferred form, I am aware that various changes and modifications may be made without departing from the principles of my invention, the scope of which is to be determined by the appended claims.

I claim as my invention:

1. In a motor stand, the combination of a pair of standards having the lower portions thereof connected together so as to maintain the standards in spaced upright relation, co-axial spindles circularly and longitudinally adjustable in the upper ends of the standards, one of said spindles being provided with a socket in the outer end, means on the inner ends of the spindles for supporting a motor therebetween and a crank having a lateral projection for engaging said socket of the spindle for detachably connecting the crank therewith so that the latter is rotatable in its standard by means of the crank.

2. In a motor stand, the combination of a pair of standards, means connecting the bottom portions of the standards for holding the latter in spaced upright relation, a pair of co-axial spindles rotatably mounted at the upper ends of the standards, means on the inner ends of the spindles for supporting a motor therebetween, an expansible clamp operable to permit rotation of the spindles and lock the spindles against rotation, a lever for contracting the clamp and adjustable means for regulating the locking position of the lever.

3. In a motor stand, the combination of a pair of standards, means connecting the standards at the bottom to maintain the standards in spaced upright position and afford an unobstructed opening between the upper ends thereof, a bearing at the upper end of each standard in axial alignment with the bearing of the other standard, a spindle mounted in each bearing for adjustment longitudinally and circularly, clamping means for locking the spindles in adjusted positions, means on the inner end of each spindle for detachably mounting a motor therebetween, a bolt loosely engaging the clamping means and having a lever threaded thereon for operating the latter and a set screw for holding the bolt in various positions of circular adjustment so as to regulate the locking position of the lever.

4. In a motor stand, the combination of a pair of concentric, spaced, rotatable, supports, a bracket on each support having portions adapted to seat between elevations on the opposite faces of the motor block, and means for drawing one of said brackets toward the other so as to clamp the motor block therebetween.

5. In a motor stand, the combination of a pair of concentric, spaced, rotatable, supports, a bracket on each support having portions extending inwardly therefrom and spaced radially from the axis of the supports to engage opposite sides of a motor so as to hold the latter with the center of gravity thereof substantially co-axial with the rotatable supports, and means connecting the offset portions of the brackets so as to clamp a motor therebetween.

6. In a motor stand, for a motor having a cylinder block with a transverse opening between two center cylinders, the combination of a pair of concentric, spaced, rotatable supports, and a bracket on each support, said brackets being adapted to engage against the opposite sides of the cylinder block, and a bolt adapted to be inserted through the central opening between the cylinders, for clamping the brackets against the opposite sides of the cylinder block.

7. In a stand for a motor with a cylinder block, having a plurality of cylinders with an expanded water jacket at the upper ends, and a crank case housing at their other ends, the combination of a support for said motor comprising a pair of relatively adjustable, co-axial, spaced supports, a yoke-shaped bracket on one of the supports having one arm engaging the water jacket and the other arm engaging the crank case, a bracket on the other support adapted to engage the walls of the cylinders between the water jacket and the crank case, and means for drawing one of the brackets toward the other to clamp the motor therebetween.

8. In a stand for a motor having a plurality of cylinders, arranged side by side, and provided with an expanded water jacket connecting their upper ends and a crank case connecting their lower ends, and an opening between two adjoining cylinders, the combination of a support therefor, comprising a pair of spaced standards, each having a rotatable member adjustably mounted at the upper end thereof, a bracket on one of said members having spaced points adapted to engage the water jacket and the crank case respectively, of the motor, a bracket on the other member having spaced parts adapted to engage between cylinders of the motor between the water jacket and the crank case, and a threaded member inserted through the said opening between the adjoining cylinders for drawing one of the brackets toward the other and clamping the same against the opposite sides of the motor block.

GEORGE F. WERTH.